US010364017B2

(12) United States Patent
Evans

(10) Patent No.: US 10,364,017 B2
(45) Date of Patent: Jul. 30, 2019

(54) STRUCTURAL COMPONENT

(71) Applicant: AIRBUS OPERATIONS LIMITED, Bristol (GB)

(72) Inventor: Steven Evans, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 333 days.

(21) Appl. No.: 15/147,460

(22) Filed: May 5, 2016

(65) Prior Publication Data

US 2016/0325820 A1    Nov. 10, 2016

(30) Foreign Application Priority Data

May 7, 2015    (GB) .................................. 1507843.9

(51) Int. Cl.
| | | |
|---|---|---|
| *B64C 1/12* | (2006.01) | |
| *B64C 3/26* | (2006.01) | |
| *B64C 1/06* | (2006.01) | |
| *B64C 3/18* | (2006.01) | |
| *B29C 70/54* | (2006.01) | |
| *B29C 70/30* | (2006.01) | |
| *B29C 70/00* | (2006.01) | |
| *B64C 1/00* | (2006.01) | |
| *B29L 31/30* | (2006.01) | |

(52) U.S. Cl.
CPC ................ *B64C 3/26* (2013.01); *B29C 70/30* (2013.01); *B29C 70/545* (2013.01); *B64C 1/064* (2013.01); *B64C 3/182* (2013.01); *B64C 3/185* (2013.01); *B64C 3/187* (2013.01); *B29C 70/00* (2013.01); *B29L 2031/3076* (2013.01); *B64C 2001/0072* (2013.01); *Y02T 50/43* (2013.01)

(58) Field of Classification Search
CPC ........... B64C 3/18; B64C 3/182; B64C 3/185; B64C 3/187; B64C 3/20; B64C 3/24; B64C 3/26; B64C 2001/0072; B64C 1/06; B64C 1/061; B64C 1/064; B29C 70/745
See application file for complete search history.

(56) References Cited

U.S. PATENT DOCUMENTS

| | | | |
|---|---|---|---|
| 4,875,795 A | 10/1989 | Anderson | |
| 4,909,655 A | 3/1990 | Anderson | |
| 9,745,043 B2 * | 8/2017 | Marin | ..................... B64C 1/061 |
| 9,849,967 B2 * | 12/2017 | Dobberfuhl | ............... B64C 3/18 |
| 2004/0231937 A1 * | 11/2004 | Goodworth | ............. B64C 1/062 |
| | | | 188/371 |

(Continued)

FOREIGN PATENT DOCUMENTS

| | | |
|---|---|---|
| EP | 2565117 | 3/2013 |
| EP | 2808156 | 12/2014 |

(Continued)

OTHER PUBLICATIONS

United Kingdom Search Report cited in GB1507843.9, dated Nov. 9, 2015, 4 pages.

*Primary Examiner* — Richard G Davis
(74) *Attorney, Agent, or Firm* — Nixon & Vanderhye P.C.

(57) ABSTRACT

The present invention relates to structural component for an aircraft. The structural component comprises a body with a first surface and a lug that extends out of the first surface. The body and lug comprise a composite material and are integrally formed.

13 Claims, 7 Drawing Sheets

(56) References Cited

U.S. PATENT DOCUMENTS

| | | | |
|---|---|---|---|
| 2010/0148008 A1* | 6/2010 | Hernando Sebastian | ..................... B64C 3/187 244/131 |
| 2011/0155854 A1* | 6/2011 | Bakker | ............. B29C 45/14221 244/132 |
| 2014/0113107 A1* | 4/2014 | Kremer | ..................... B64C 3/18 428/121 |
| 2014/0216638 A1* | 8/2014 | Vetter | ................ B29D 99/0014 156/227 |
| 2015/0034763 A1 | 2/2015 | Marin et al. | |
| 2016/0194071 A1* | 7/2016 | Abe | ........................ B29C 65/48 403/265 |

FOREIGN PATENT DOCUMENTS

| | | | |
|---|---|---|---|
| JP | H04334696 | 11/1992 | |
| WO | WO-2012143363 A2 * | 10/2012 | ............... B64C 3/18 |

\* cited by examiner ial, for example, any pre-impregnated or dry fibre material

STRUCTURAL COMPONENT

RELATED APPLICATIONS

The present application claims priority from Great Britain Application No. 1507843.9, filed May 7, 2015, the disclosure of which is hereby incorporated by reference in its entirety.

INTRODUCTION

The present invention relates to structural component for an aircraft and to an aircraft comprising the same. The present invention also relates to a method of manufacturing a structural component.

BACKGROUND

In conventional commercial aircraft wing design, it is common to use a structural box to carry the majority of the load developed by lift and other high load devices. An example of part of such a structural box 1 is illustrated in the perspective view of FIG. 1 from which it can be seen that it is built from a number of different sections including spars 2, ribs 3 and stringers 4, which form the main load-bearing structural components of the wing, with a lower wing cover 5 and an upper wing cover(not shown) forming an outer skin surface.

The stringers 4 are attached to the inside of the wing covers 5 and provide support. The ribs 3 extend transversely to the stringers 4 to shape the cross-sectional profile of the aircraft wing and provide additional support to the wing covers 5. The space inside the structural box 1 may form a fuel tank (not shown), with the wing covers 5 enclosing the fuel tank. The ribs 3 are secured to the stringers 4 to prevent the ribs 3 from moving relative to the wing covers 5 and to hold the covers 5 is position such that they are not deformed by the pressure exerted thereon by the fuel in the fuel tank.

In conventional wing structures, the ribs 3 are secured to the stringers 4 and covers 5 using a plurality of brackets (not shown) that are bolted to the ribs 3 and through the covers 5. A hole is drilled in the body of each of the stringers 4 such that the bracket can be bolted thereon to secure the rib 3 relative to the stringer 4. However, it has been found that drilling a hole in the body of the stringer 4 reduces the strength and stiffness of the stringer 4. In addition, the bolt heads protrude from the outside surfaces of the covers 5 such that the aerodynamic drag of the covers 5 is increased. Furthermore, if bolt holes are drilled through the portion of the covers 5 that form the fuel tank, the bolt holes will need to be carefully sealed to prevent fuel leaking through the bolt holes. Such sea s increase the manufacturing complexity of the wing structure.

Each of the brackets must be manufactured to extremely tight tolerances to ensure that when the brackets are mounted to the stringers 4, each of the ribs 3, stringers 4 and covers 5 are correctly aligned so that the cross-sectional profile of the aircraft wing is not distorted. Alternatively, differences in the profile of the bracket and the stringer 4 may be rectified by shimming. However, shimming makes high volume and/or low cost manufacture of the structural box difficult. Furthermore, the stringer 4 must be provided with a portion of increased width to provide sufficient surface area for the bracket to be bolted to. However, this portion of increased width adds weight to the stringer 4. In some configurations the brackets are bonded to the stringer 4. However, such a configuration may still require that the bracket is additionally bolted to the stringer 4 for fail safe reasons in the event that the bond fails.

The present invention seeks to overcome or substantially alleviate at least some of the problems with conventional assemblies referred to above.

SUMMARY OF INVENTION

According to the invention, there is provided a [claims].

DESCRIPTION OF THE EMBODIMENTS

Embodiments of the invention will now be described, by way of example only, with reference to FIGS. 2-7 of the accompanying drawings.

Figure 1:
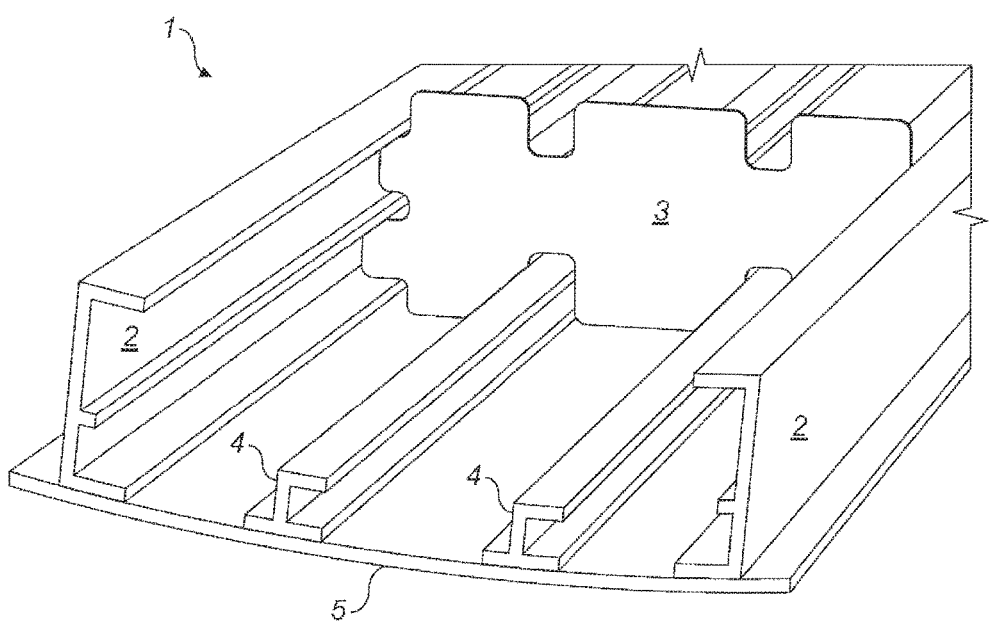
FIG. 1 is a cross-sectional schematic side view through a prior art wing box structure for an aircraft.
Figure 2:
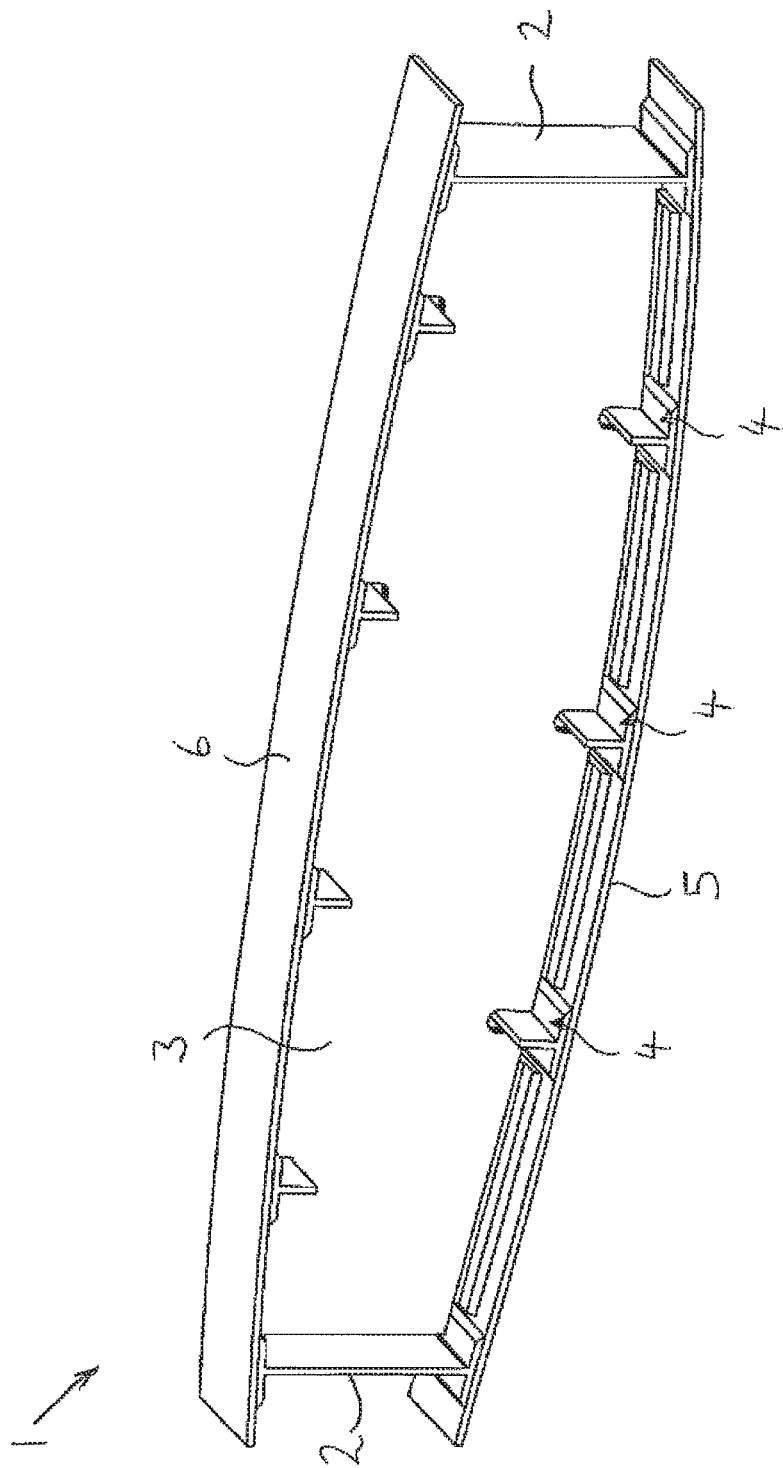
FIG. 2 is a cross-sectional schematic side view through a wing box structure comprising a structural component according to a first embodiment of the invention.

A wing box structure 11 is shown in FIG. 2 and comprises a plurality of components joined together. The components comprise a pair of spaced spars 12 with ribs 13 extending between the spars 12. Upper and lower covers 16, 15 are attached to the spars 12 and ribs 13 and form the wing outer skin. A plurality of stringers 14 are bonded or co-cured to the upper and lower covers 16, 15 and extend transverse to the ribs 13 in a longitudinal direction of the wing.

The stringers 14 are generally 'T' shaped in cross-section, with a foot portion 14A bonded or co-cured to the surface of the upper and lower covers 16, 15 and a blade or fin portion 14B upstanding from the middle of the foot portion 14A. Although the stringers 14 are shown as being substantially 'T' shaped in cross-sectional profile, other profiles are also envisaged. For example, the stringers 14 may alternatively be "L" or "J" shaped in cross-sectional profile.

Figure 3:
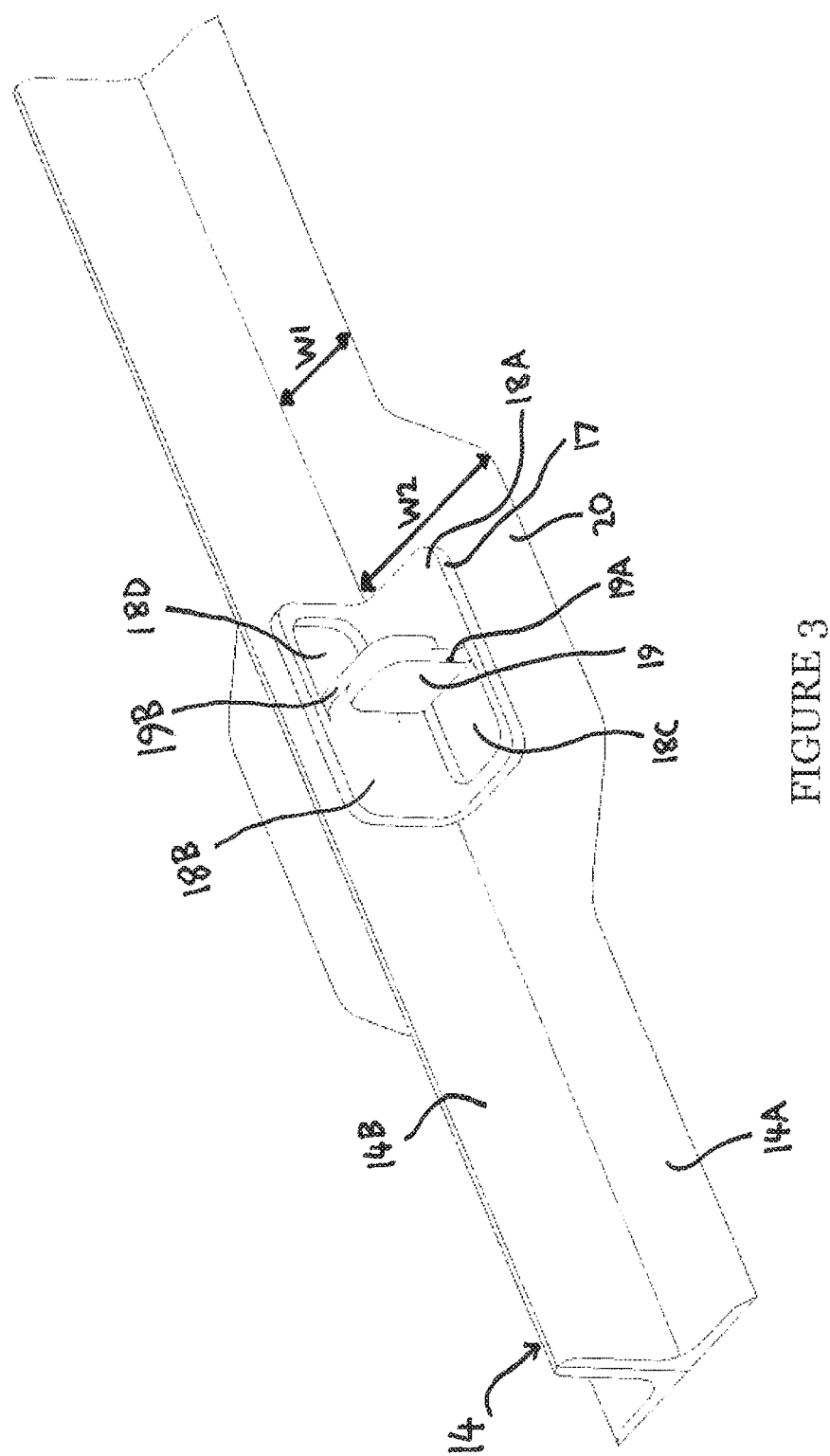
FIG. 3 is a schematic perspective view of the structural component of the wing box structure shown in FIG. 2, co-cured to a stringer.

Referring now to FIG. 3, a structural component according to a first embodiment of the invention is shown. The structural component comprises a bracket 17 for securing a stringer 14 to a rib 13. However, it should be recognised that the bracket could also be used to secure together other types of aircraft components.

A bracket 17 is provided on each stringer 14 to secure the stringers 14 to respective ribs 13 of the wing box structure 11.

The bracket 17 is manufactured from a composite material, for example, any pre-impregnated or dry fibre material that is formed into a plurality of layers of interwoven or unidirectional (UD) fibres, also known as 'plys', which are initially arranged in a substantially flat composite sheet. One such composite material is HEXPLY™ M21E by HEX- CEL™. The material of the bracket 17 may be manufactured using Automated Tape Laying (ATL) or Automated Fibre Placement (AFP), and then die-cut or punched out to the required shape. One half of the flat sheet comprises a first attachment portion 18A and the other half of the flat sheet comprises a second attachment portion 18B.

To manufacture the bracket 17, an incision is cut into each of the first and second attachment portions 18A, 18B, through the entire thickness of the flat sheet, such that first and second flaps 19A, 19B of composite material are formed in the first and second attachment portions 18A, 18B respectively. The first and second flaps 19A, 19B initially lie coplanar with the major surfaces of the first and second attachment portions 18A, 18B respectively. The first flap 19A of composite material is then folded such that the first flap 19A extends perpendicularly to a major surface of the first attachment portion 18A. Similarly, the second flap 19B of composite material is folded, to extend in the same direction as the first flap 19A, such that the second flap 19B extends perpendicularly to a major surface of the second attachment portion 18B. The incisions cut through the first and second attachment portions 18A, 18B are "U" shaped such that the resultant first and second flaps 19A, 19B of composite material are also "U" shaped.

The first and second flaps 19A, 19B are both substantially flat and form plate-like projections that protrude from the respective first and second attachment portions 18A, 18B. The first and second flaps 19A, 19B each have opposite facing major planar surfaces, The first and second flaps 19A, 19B are arranged such that the major surfaces thereof are parallel.

First and second apertures 18C, 18D are formed through the first and second attachment portions 18A, 18B respectively when the first and second flaps 19A, 19B are folded out of the first and second attachment portions 18A, 18B.

After the first and second flaps 19A, 19B have been folded such that they are perpendicular to the first and second attachment portions 18A, 18B, the flat sheet is folded such that the first and second attachment portions 18A, 18B are positioned perpendicular to each other and together comprise a generally "L" shaped cross-section.

When the flat sheet is folded , a major surface of each of the first and second flaps 19A, 19B are brought into abutment. The composite material of the bracket 17 is then cured, which causes the first and second flaps 19A, 19B to become integrally formed to form a lug 19. Since the lug 19 comprises first and second flaps 19A, 19B of material, the lug 19 has an increased inherent stiffness, in comparison to if the lug 19 only comprised a single flap of material, and so the lug 19 can withstand a greater load before deforming.

The bracket 17 is secured to the foot portion 14A of the stringer 14. The foot portion 14A of the stringer 14 comprises a section of reduced width W1 and a section of increased width W2 that forms a stringer grow-out 20. The stringer grow-out 20 is integrally formed with the foot portion 14A of the stringer 14.

The stringer 14 is manufactured from a composite material, for example, any pre-impregnated or dry fibre material that is formed into a plurality of layers of interwoven or unidirectional (UD) fibres, also known as 'plys'. To secure the bracket 17 to the stringer 14, the bracket 17 is positioned on the stringer 14 prior to the composite material of the stringer 14 and the bracket 17 being cured. The bracket 17 is positioned such that the first attachment portion 18A sits flush to a section of the foot portion 14A, on the stringer grow-out 20, and the second attachment portion 18B sits flush to a section of the fin portion 14B.

When the bracket 17 has been positioned on the stringer 14, the bracket 17 is secured to the stringer 14 by co-curing the stringer 14 and bracket 17. After co-curing, the stringer 14 and bracket 17 are integrally formed such that the lug 19 is integrally formed with the stringer 14.

A bolt hole (not shown) is provided through lug 19. The bolt hole extends through the lug 19 in a direction normal to the major surfaces of the lug 19. A corresponding bolt hole (not shown) is provided in the part of the rib 13 to which the stringer 14 is to be secured.

The rib 13 is positioned so that a surface thereof sits flush to a major surface of the lug 19 of the bracket 17, such that the bolt holes of the bracket 17 and rib 13 are aligned. The rib 13 can then be bolted to the bracket 17 to secure the rib 13 to the. stringer 14.

The bracket 17 being integrally formed with the stringer 14 advantageously reduces the number of components that must be bolted or bonded together to form the aircraft structure in comparison to arrangements wherein a separate bracket is bolted/bonded to both the rib and the stringer. Therefore, the bracket 17 of the present invention reduces the number of bolts and/or the amount of adhesive required to construct the aircraft structure and so the weight of the aircraft structure is reduced. In addition, since the bracket 17 of the present invention is integrally formed with the stringer 14, it is not necessary for any bolt holes to be drilled directly into the foot portion 14A and/or fin portion 14B of the stringer 14. This is advantageous since such bolt holes may otherwise weaken the stringer 14. In addition, since the bracket 17 is integrally formed with the stringer 14, it is not necessary to provide bolts through the stringer 14, covers 15, 16 and bracket 17 to secure these components together. This is advantageous since some of the bolts would otherwise penetrate the fuel tank, which would then need to be separately sealed, and also the bolt heads would protrude from the covers 15, 16, which would increase the aerodynamic drag of the covers 15, 16.

Since the lug 19 comprises a first flap 19A that extends from the first attachment portion 19A and a second flap 19B that extends from the second attachment portion 19B, any load exerted on the lug 19 is evenly distributed to the foot and fin portions 14A, 14B of the stringer 14.

Although in the above described embodiment the bracket 17 is co-cured. with the stringer 14 such that the bracket 17 and stringer 14 are integrally formed, in an alternate embodiment (not shown) the bracket is not integrally formed with the stringer and instead is a discrete component that is attached to the stringer, for example, by adhesive or bolts. Since the bracket of this alternative embodiment is not integrally formed with the stringer, the bracket does not provide the advantages associated with reducing the number of components that must be secured together to form the aircraft structure. However, such an embodiment of bracket, which is manufactured from a composite material, still provides the advantage of being lightweight in comparison to the traditional metallic brackets known in the art. In addition, the lug of the bracket still has an increased inherent stiffness because it comprises first and second flaps that are integrally formed. Furthermore, since the alternative embodiment of the bracket is not attached to the stringer by co-curing, the bracket can easily be retrofitted to existing structural components, including those that are not manufactured from composite materials.

In the above described embodiments, the incisions that form the first and second flaps 19A, 19B are formed through the entire thickness of the respective first and second attachment portions 18A, 18B. Therefore, when the first and second flaps 19A, 19B are folded out of the first and second attachment portions 18A, 18B, the first and second apertures 18C, 18D are formed in the respective first and second attachment portions 18A, 18B. However, in an alternate embodiment (not shown) the incisions are only formed partially through the thickness of the first and second attachment portions 18A, 18B. Therefore, when the first and second flaps 19A, 19B are folded, only a portion of the thickness of the first and second attachment portions 18A, 18B is folded out of the plane of the corresponding major surfaces thereof such that recesses are formed that extend into, but not entirely through, the thickness of the first and second attachment portions 18A, 18B.

Although in the above described embodiments the lug 19 comprises first and second flaps 19A, 19B, in an alternate embodiments (not shown) one of the first and second flaps 19A, 19B is omitted and instead the lug 19 comprises only one of the first and second flaps 19A, 19B.

Although in the above described embodiments the bracket 17 is used to secure a rib 13 to a stringer 14, it should be recognised that the bracket 17 is suitable for securing other structural components together. For example, the bracket 17 could alternatively be used to secure a strut 12 to a rib 13, with the bracket 17 being co-cured to one of the strut 12 or rib 13 and a bolt hole being provided in the other of the strut 12 or rib 13 to align with the bolt hole of the bracket 17. In addition, although the bracket 17 is described for use in securing aircraft components together, it should be recognised that the bracket is also suitable for securing together structural components used in other applications, for example, spacecraft, buildings or ships.

Figure 4:
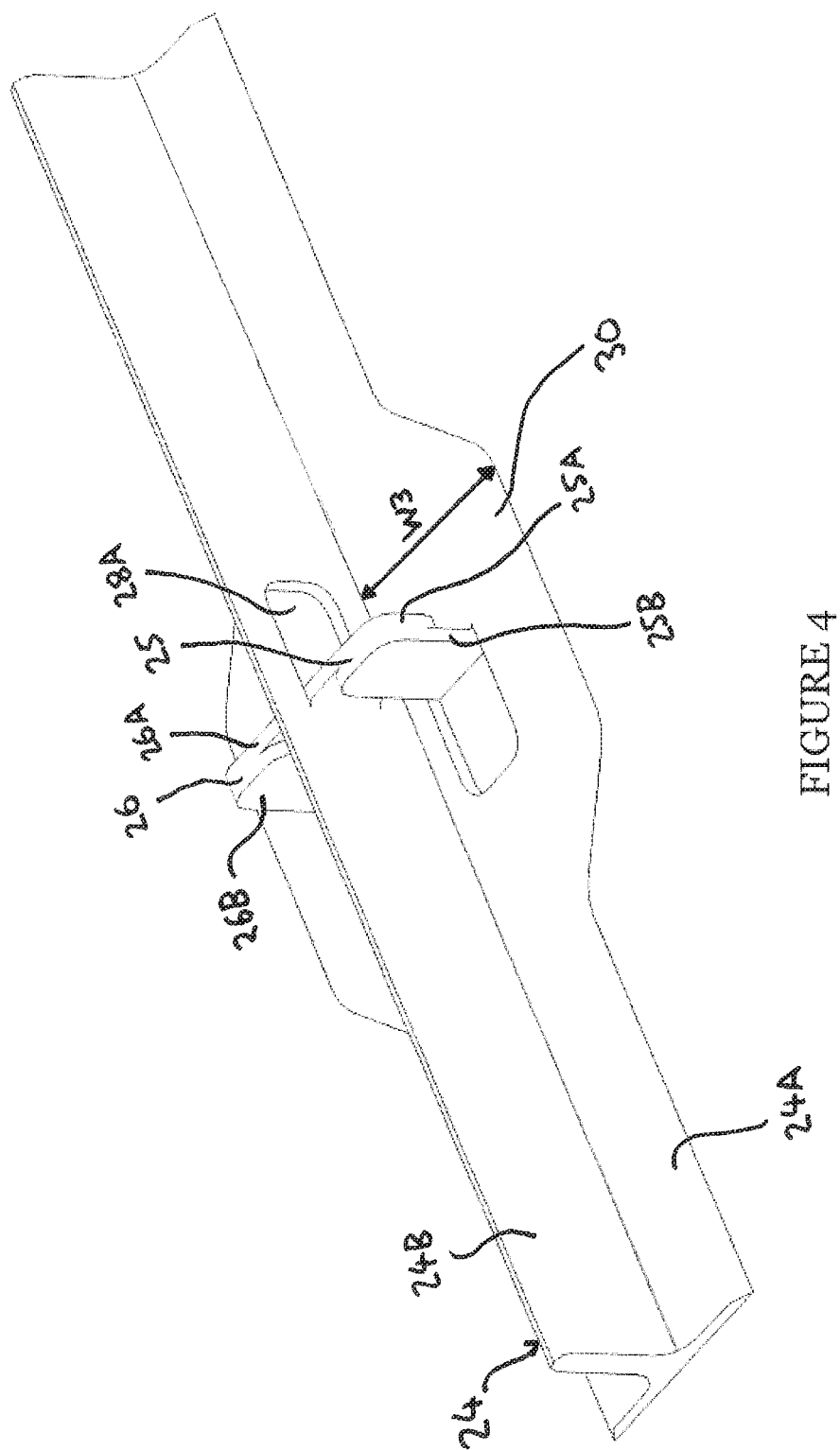
FIG. 4 is a schematic perspective view of a structural component according to a second embodiment of the invention.
Figure 5:
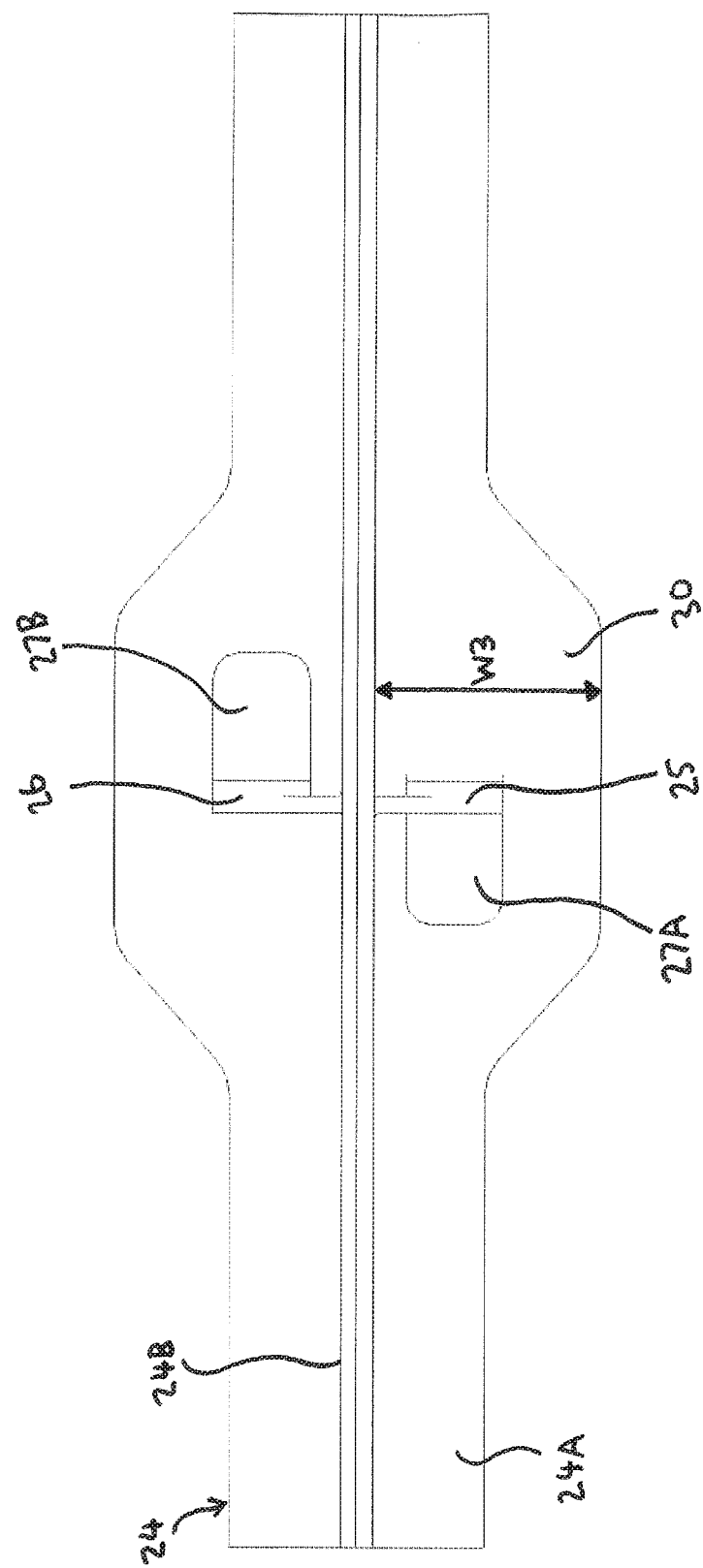
FIG. 5 is a schematic top view of the structural component of FIG. 4.

Referring now to FIGS. 4 and 5, a structural component according to a second embodiment of the invention is shown. The structural component comprises a stringer 24 and is secured to a second structural component in the form of a rib. However, it should be recognised that the structural component may comprise an aircraft component other than a stringer and may be secured to an aircraft component other than a rib.

The stringer 24 is formed into a generally 'T' shaped in cross-section, with a foot portion 24A bonded to the surface of the upper and lower covers of an aircraft structure and a blade or fin portion 24B upstanding from the middle of the foot portion 24A, Although the stringer 24 is shown having a substantially 'T' shape in cross-sectional profile, other profiles are also envisaged.

The foot portion 24A of the stringer 24 comprises a section of increased width W3 that forms a stringer grow-out 30. The stringer grow-out 30 is integrally formed with the foot portion 24A of the stringer 24.

The stringer 24 is manufactured from a composite material, for example, any pre-impregnated or dry fibre material that is formed into a plurality of layers of interwoven or unidirectional (UD) fibres, also known as 'plys'. Prior to the composite material of the stringer 24 being cured, first and second lugs 25, 26 are formed from the composite material of the stringer 24.

To form the first and second lugs 25, 26, first and second incisions are formed through the thickness of the foot portion 24A of the stringer 24, at the stringer grow-out 30 on opposite sides of the fin portion 24B, such that first and second flaps 25A, 26A of composite material are formed in the foot portion 24A. In addition, third and fourth incisions are formed partially through the thickness of the fin portion 24B of the stringer 24, on opposing major surfaces of the fin portion 24B, such that third and fourth flaps 25B, 26B of composite material are formed in the fin portion 24B.

The first and second flaps 25A, 26A initially lie coplanar with the foot portion 24A and the second and third flaps 25B, 26B initially lie coplanar with the fin portion 24B. The third and fourth flaps 25B, 26B are folded such that they extend perpendicularly to the major surfaces of the fin portion 24B and extend in opposite directions. In addition, the first and second flaps 25A, 26A are folded such that they extend perpendicularly to the major surfaces of the foot portion 24A and extend in the same direction that the fin portion 24B upstands from the foot portion 24A. The first and second flaps 25A, 26A contact the third and fourth flaps 25B, 26B respectively.

The first, second, third and fourth incisions each extend in a "U" shape. such that the resultant first, second, third and fourth flaps 25A, 26A, 25B, 26B are "U" shaped. The ends of the first and second incisions are aligned in the longitudinal direction of the foot portion 24A of the stringer 24 and the ends of the third and fourth incisions are aligned in the longitudinal direction of the fin portion 24B of the stringer 24.

The first and second incisions extend in opposite longitudinal directions of the foot portion 24A of the stringer 24. Therefore, when the first and second flaps 25A, 26A are folded out of the respective sections of the foot portion 24A of the stringer 24, first and second apertures 27A, 27B are formed through the thickness of the foot portion 24A and extend in opposite longitudinal directions of the foot portion 24A. The first and second apertures 27A, 27B do not substantially overlap in the longitudinal direction of the foot portion 24A. The first and second apertures 27A, 27B weaken the foot portion 24A and so it is advantageous that the first and second apertures 27A, 27B do not overlap in the longitudinal direction of the foot portion 24A so that the weakening of the stringer grow-out 30 caused by the apertures 27A, 27B is not concentrated at a point along the length of the foot portion 24A. The increased width W3 of the foot portion 24A at the stringer grow-out 30 provides additional composite material to compensate for the weakening in the foot portion 24A caused by the first and second apertures 27A, 21B.

Similarly, the third and fourth incisions extend in opposite longitudinal directions of the fin portion 24B of the stringer 24. Therefore, when the third and fourth flaps 25B, 26B are folded out of the respective major surfaces of the fin portion 24B, a first recess 28A and a second recesses (not shown) are formed partially through the thickness of the fin portion 24B in the respective major surfaces thereof. The first and second recesses 28A extend in opposite longitudinal directions of the fin portion 24B. The first and second recesses 28A do not substantially overlap in the longitudinal direction of the fin portion 24B. This is advantageous since the weakening of the fin portion 24B that is caused by the first and second recesses 28A is not concentrated at a point along the length of the fin portion 24B.

The first, second, third and fourth flaps 25A, 26A, 25B, 26B are substantially flat and comprise plate-like projections from the respective foot and fin portions 24A, 24B of the stringer 24. The first and third flaps 25A, 26A have opposing major planar surfaces that abut and the second and fourth flaps 25B, 26B have opposing major planar surfaces that abut.

After the first and third flaps 25A, 25B have been folded such that they abut and the second and fourth flaps 26A, 26B have been folded such that they abut, the composite material of the stringer 24 is cured. This causes the first and third flaps 25A, 25B to become integrally formed to form the first lug 25 and the second and fourth flaps 26A, 26B to become integrally formed to form the second lug 26. Therefore, the stringer 24 comprises integrally formed first and second lugs 25, 26, Since the first and second lugs 25, 26 are each formed from two flaps 25A, 26A, 25B, 26B of composite material, the first and second lugs 25, 26 each have an increased inherent stiffness and so can withstand a greater load before deforming.

A bolt hole (not shown) is provided through each of the first and second lugs 25, 26. The bolt holes extend through the respective first and second lugs 25, 26 in a direction normal to the major surfaces thereof. Corresponding bolt holes (not shown) are provided in the rib (not shown) to which the stringer 24 is to be secured.

The rib comprises a slot that receives the fin portion 24B of the stringer 24 so that the rib can be positioned such that a major surface thereof sits flush to a major surface of each of the first and second lugs 24, 26, with the bolt holes of the first and second lugs 25, 26 aligned with the bolt holes in the rib. The rib is then bolted to the first and second lugs 25, 26 to secure the rib to the stringer 24.

The first and second lugs 25, 26 being integrally formed with the foot and fin portions 24A, 24B of the stringer 24 negates the requirement for a bracket, which would otherwise need to be co-cured/bolted/bonded to both the rib and stringer. Therefore, the number of components is reduced and fewer bolts/less adhesive are required to construct the aircraft structure, which reduces the weight of the aircraft structure. In addition, since the first and second lugs 25, 26 are integrally formed with the stringer 24, it is not necessary for any bolt holes to be drilled directly into the foot portion 24A and/or fin portion 24B of the stringer 24. This is advantageous since such bolt holes would otherwise weaken the stringer 24. In addition, since the first and second lugs 25, 26 are integrally formed with the stringer 24, it is not necessary to provide bolts through the stringer 24 and covers 15, 16. This is advantageous since so/no of the bolts would otherwise penetrate the fuel tank, in which may require that the bolt holes are sealed to prevent the leakage of fuel from the fuel tank. Furthermore, the. bolt heads would protrude from the covers 15, 16 and so would increase the aerodynamic drag of the covers 15, 16.

In the above described embodiment the first and second incisions extend through the entire thickness of the foot portion 24A and the third and fourth incisions extend only partially through the thickness of the fin portion 24B, this is achieved by cutting the profiles out of the flat sheet of composite material and then forming the tabs before forming the main section of the stringer 24. In alternate embodiments (not shown) the first and second incisions extend only partially through the thickness of the foot portion 24A and/or the third and fourth incisions extend through the entire thickness of the fin portion 24B.

Although in the above described embodiment the first lug 25 comprises first and second flaps 25A, 26A of composite material and the second lug 26 comprises third and fourth flaps 25B, 26B of composite material, in an alternate embodiment (not shown) one of the first and second flaps 25A, 26A and/or one of the third and fourth flaps 25B, 26B is omitted. Furthermore, one of the first and second lugs 25, 26 may be omitted entirely.

Although in the above described embodiments the incisions that form the first, second, third and fourth flaps 19A, 25A, 19B, 26A, 25B, 26B of composite material are "U" shaped, in alternate embodiments (not shown) the incisions are another shape, for example, "V" shaped, "C" shaped or "square-U" shaped.

Figure 6:
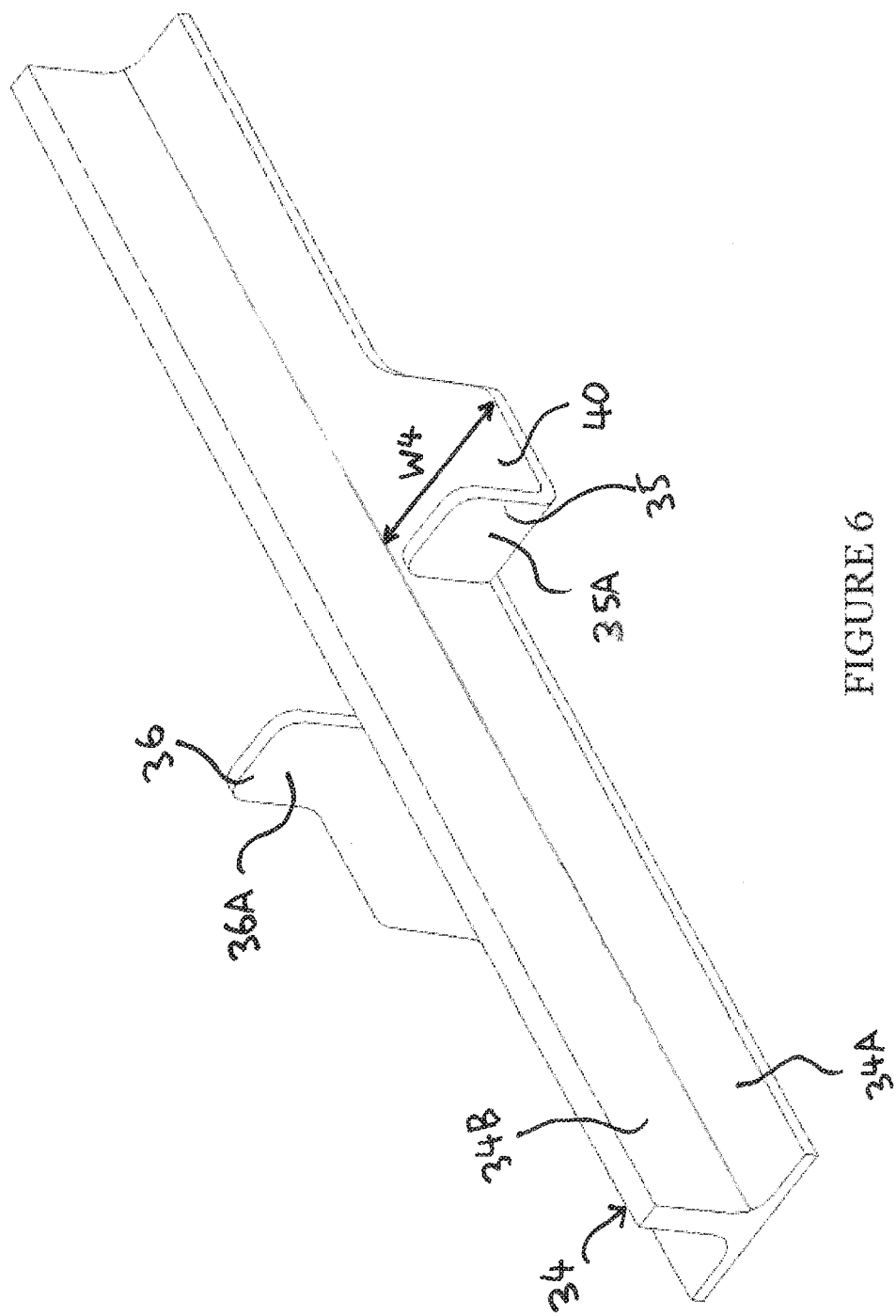
FIG. 6 is a schematic perspective view of a structural component according to a third embodiment of the invention; and, FIG. 7 is a schematic perspective view of an aircraft comprising the structural component of FIG. 6.

Referring now to FIG. 6, a structural component according to a third embodiment of the invention is shown. As with the second embodiment of the invention, the structural component comprises a stringer 34. The stringer 34 is secured to a second structural component comprising a rib. However, it should be recognised that the structural component may comprise an aircraft component other than a stringer and may be secured to an aircraft component other than a rib.

The stringer 34 is formed into a generally "T" shaped cross-section, with afoot portion 34A bonded or co-cured to the surface of the upper or lower cover of an aircraft structure and a blade or fin portion 34B upstanding from the middle of the foot portion 34A. Although the stringer 34 is shown having a substantially 'T' shape in cross-sectional profile, other profiles are also envisaged.

The foot portion 34A of the stringer 34 comprises a section of increased width W4 that forms a stringer grow-out 40. The stringer grow-out 40 is integrally formed with the foot portion 34A of the stringer 34.

The grow-out 40 comprises first and second flaps 35A, 36A of composite material that are folded such that they are perpendicular to the major surfaces of the grow-out 40, After the first and second flaps 35A, 36A have been folded, the composite material of the grow-out 40 is cured such that the first and second flaps 35A, 36A form first and second lugs 35, 36 respectively. The lugs 35, 36 are disposed on opposite sides of the fin portion 34B of the stringer 34.

It has been found that if the ribs are secured to the stringer using a bracket that is bonded or co-cured to the stringer, then if the stringer bends, for example due to flexing of the wing covers during flight, then a large shear stress may be experienced at the interface between stringer and the bracket that may require structural reinforcement of the interface. This problem is alleviated in the second, third and fourth embodiments of the invention since the lugs are formed from the composite material of the stringer and so may flex with the stringer.

Figure 7:
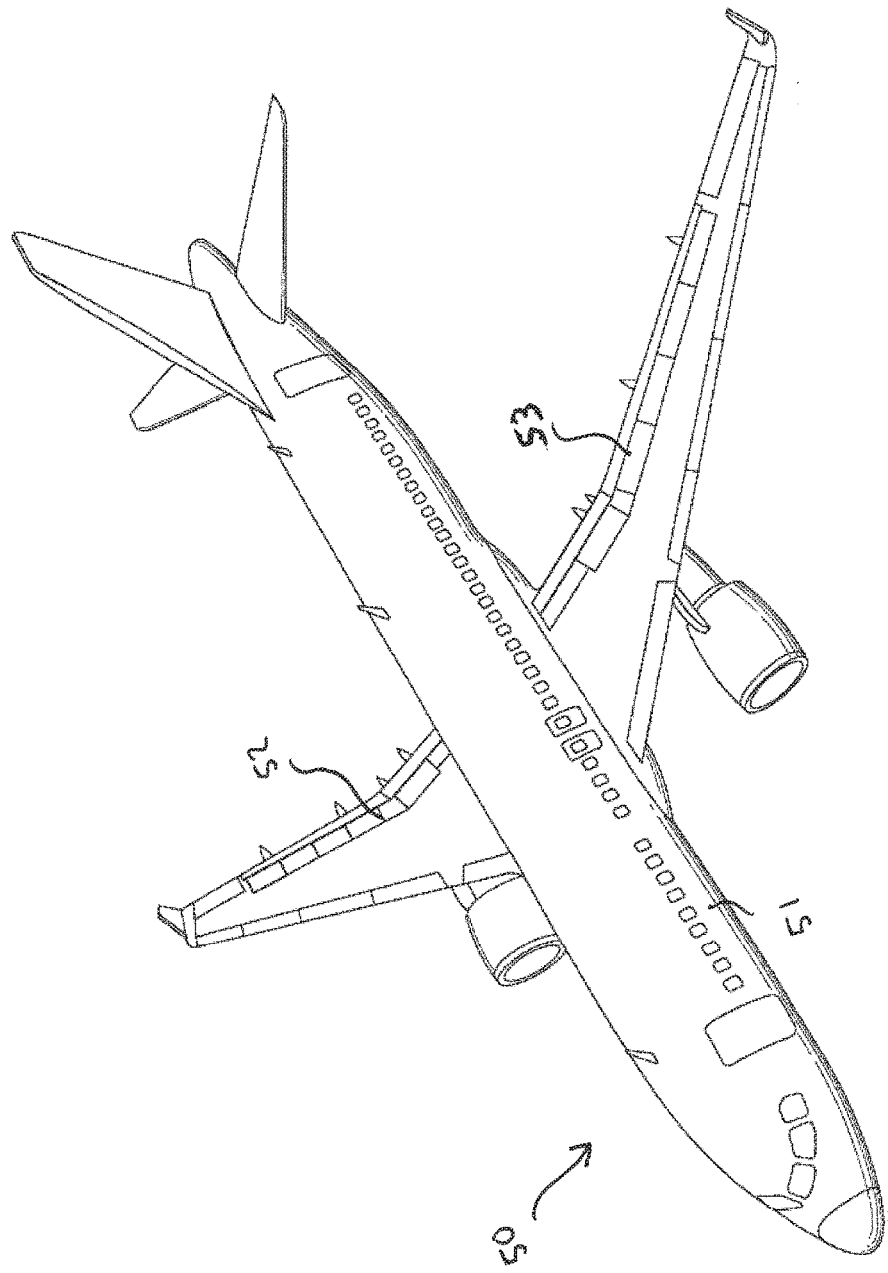

Referring now to FIG. 7, an aircraft 50 comprising a fuselage 51 and first and second wings 52, 53 is shown, The first and second wings 52, 53 each comprise a wing box structure that includes a plurality of structural components according to the third embodiment of the invention.

The structural assembly joints of the invention have been described herein in the context of joining components of a box section of an aircraft wing.

However, it will be appreciated that the structural assembly joints of the invention may be used in many other applications such as automotive vehicles, spacecraft, satellites, or other aircraft types and structures.

It will be appreciated that the foregoing description is given by way of example only and that modifications may be made to the present invention without departing from the scope of the appended claims.

The invention claimed is:

1. A structural component for an aircraft, comprising:
a body with a first surface and a lug that extends out of the first surface, wherein the body and lug comprise a composite material and are integrally formed, and wherein the lug comprises a first element that extends at an angle from the first surface of the body and a second element that extends at an angle from a second surface that is at an angle to the first surface,
wherein the lug comprises a first flap of material that is folded out of the first surface at a first end of the body to form the first element, and a second flap of material that is folded out of the second surface at a second opposing end of the body to form the second element, and wherein the first and second elements are integrally formed.

2. A structural component according to claim 1, wherein the lug extends substantially perpendicularly to the first surface.

3. A structural component according to claim 1, wherein the first element extends substantially perpendicularly to the first surface of the body and the second element extends substantially perpendicularly to the second body surface.

4. A structural component according to claim 1, wherein the lug comprises a first flap of material that is folded out of the first surface to form the first element and a second flap of material that is folded out of the second surface to form the second element.

5. A structural component according to claim 4, wherein the first flap of material is cut out of the first surface and/or the second flap of material is cut out of the second surface.

6. A structural component according to claim 1, wherein the first element is substantially coplanar with the second element.

7. A structural component according to claim 1, wherein the lug is co-cured with the body.

8. A structural component according to claim 1, wherein the lug and the portion of the body from which the lug extends are manufactured from a single piece of material.

9. A structural component according claim 1, wherein the body comprises a fin portion and a foot portion.

10. A structural component according to claim 1, wherein the structural component comprises a bracket.

11. A structural component according to claim 10, wherein the bracket is configured to be secured to a stringer, rib or strut for an aircraft and, wherein the bracket is configured to be co-cured to said stringer, rib or strut for an aircraft.

12. An aircraft structure, comprising:
a bracket and a structural component, wherein the bracket comprises a body with a first surface and a lug that comprises a first element that extends at an angle out of the first surface and second element that extends at an angle from the second surface, and wherein the first and second elements are integrally formed, wherein the body and lug comprise a composite material and are integrally formed, and wherein the lug comprises a first flap of material that is folded out of the first surface at a first end of the body to form the first element, and a second flap of material that is folded out of the second surface at a second opposing end of the body to form the second element, and wherein the structural component is in the form of a stringer, rib or strut and comprises a body, wherein the lug of the bracket is mounted to the exterior of the body of the structural component.

13. A structural component for an aircraft, comprising:
a body with a first surface bounded within peripheral edges of the body;
a lug that extends out of the first surface;
wherein the body and lug comprise a composite material and are integrally formed; and,
wherein the lug comprises a first element that extends at an angle from the first surface of the body,
wherein the lug comprises a first flap of material that is folded out of the first surface at a first end of the body to form the first element, and a second flap of material that is folded out of the second surface at a second opposing end of the body to form the second element.

* * * * *